(12) United States Patent
Tang

(10) Patent No.: US 9,465,535 B2
(45) Date of Patent: Oct. 11, 2016

(54) METHOD FOR OPERATING VIRTUAL ADJUSTING BUTTON

(71) Applicant: Wistron Corporation, New Taipei (TW)

(72) Inventor: Hao Tang, New Taipei (TW)

(73) Assignee: Wistron Corporation, New Taipei (TW)

( * ) Notice: Subject to any disclaimer, the term of this patent is extended or adjusted under 35 U.S.C. 154(b) by 305 days.

(21) Appl. No.: 14/083,448

(22) Filed: Nov. 19, 2013

(65) Prior Publication Data

US 2015/0012857 A1    Jan. 8, 2015

(30) Foreign Application Priority Data

Jul. 8, 2013  (CN) .......................... 2013 1 0284944

(51) Int. Cl.
| | |
|---|---|
| *G06F 3/023* | (2006.01) |
| *G06F 3/0488* | (2013.01) |
| *G06F 9/44* | (2006.01) |
| *G06F 3/0484* | (2013.01) |

(52) U.S. Cl.
CPC ....... *G06F 3/04886* (2013.01); *G06F 3/04847* (2013.01); *G06F 3/0236* (2013.01); *G06F 9/4443* (2013.01)

(58) Field of Classification Search
CPC .............. G06F 3/0236; G06F 3/0484; G06F 3/04886; G06F 9/4443
See application file for complete search history.

(56) References Cited

U.S. PATENT DOCUMENTS 6,922,816 B1 *  7/2005  Amin .................. G06F 3/04847
715/732
7,720,552 B1 *  5/2010  Lloyd .................. G05B 19/106
345/156

(Continued)

FOREIGN PATENT DOCUMENTS

| TW | 201232354 | 8/2012 |
|---|---|---|
| TW | 201327359 | 7/2013 |

OTHER PUBLICATIONS

"Office Action of Taiwan Counterpart Application" with partial English translation thereof, issued on Jun. 30, 2015, p. 1-p. 15, in which the listed foreign references were cited.

*Primary Examiner* — Eric J Bycer
(74) *Attorney, Agent, or Firm* — Jianq Chyun IP Office

(57) ABSTRACT

A method for operating a virtual adjusting button is provided. A virtual adjusting button is displayed. The virtual adjusting button is operated by an operating point of an operating unit for adjusting a setting value correspondingly. A movement of the operating point is detected when the operating point is located on the virtual adjusting button and the virtual adjusting button is selected. A dynamic virtual adjusting button corresponding to the virtual adjusting button is displayed with the movement of the operating point when detecting that the operating point moves toward a direction away from or close to a reference point of the virtual adjusting button. A displaying size of the dynamic virtual adjusting button is changed correspondingly with a change of a distance between the operating point and the reference point. A precision of the setting value for adjusting is changed by operating the dynamic virtual adjusting button.

16 Claims, 6 Drawing Sheets

(56) References Cited

U.S. PATENT DOCUMENTS

| | | | |
|---|---|---|---|
| 2007/0182763 A1* | 8/2007 | Venolia | G06F 3/0481 345/661 |
| 2008/0141165 A1* | 6/2008 | Feig | G06F 3/04847 715/786 |
| 2008/0204476 A1* | 8/2008 | Montague | G06F 3/04845 345/661 |
| 2009/0282362 A1* | 11/2009 | Matsumoto | G06F 3/04855 715/787 |
| 2010/0039400 A1* | 2/2010 | Jang | G06F 3/0485 345/173 |
| 2010/0146435 A1* | 6/2010 | Cros | G06F 3/04855 715/786 |
| 2011/0055760 A1* | 3/2011 | Drayton | G06F 3/0482 715/834 |
| 2011/0095993 A1* | 4/2011 | Zuverink | G06F 3/04847 345/173 |
| 2011/0167369 A1* | 7/2011 | van Os | G06F 3/0483 715/769 |
| 2011/0246943 A1* | 10/2011 | Fujibayashi | G06F 3/04847 715/833 |
| 2012/0036476 A1* | 2/2012 | Oh | G06F 3/0481 715/811 |
| 2012/0092267 A1* | 4/2012 | Haug | G06F 3/0383 345/173 |
| 2012/0144345 A1* | 6/2012 | Munter | G06F 3/04883 715/863 |
| 2012/0192110 A1 | 7/2012 | Wu | |
| 2012/0218293 A1* | 8/2012 | Yamasaki | G06F 3/0483 345/629 |
| 2012/0226977 A1* | 9/2012 | Lengeling | G06F 3/04883 715/702 |
| 2012/0280922 A1* | 11/2012 | Lee | G06F 3/04847 345/173 |
| 2013/0127910 A1* | 5/2013 | Tijssen | G06F 3/04883 345/642 |
| 2013/0127911 A1* | 5/2013 | Brown | G06F 3/04886 345/649 |
| 2013/0132892 A1* | 5/2013 | Lentz | G06F 3/04855 715/786 |
| 2013/0169552 A1 | 7/2013 | Hsieh | |
| 2013/0311920 A1* | 11/2013 | Koo | G06F 3/04883 715/765 |
| 2013/0322848 A1* | 12/2013 | Li | H04N 5/783 386/241 |
| 2014/0195978 A1* | 7/2014 | Doepke | G06F 3/04812 715/833 |
| 2014/0245226 A1* | 8/2014 | Butscher | G06F 3/04847 715/834 |
| 2014/0313135 A1* | 10/2014 | Pisters | G06F 3/0484 345/173 |

\* cited by examiner

METHOD FOR OPERATING VIRTUAL ADJUSTING BUTTON

CROSS-REFERENCE TO RELATED APPLICATION

This application claims the priority benefit of China application serial no. 201310284944.1, filed on Jul. 8, 2013. The entirety of the above-mentioned patent application is hereby incorporated by reference herein and made a part of this specification.

TECHNICAL FIELD

The present invention relates to a method for controlling a virtual adjusting button, and more particularly to a method for operating a virtual adjusting button capable of enhancing the prevision of a setting value.

BACKGROUND

In general, a certain graphic user interfaces (GUIs) are often present in electronic devices, and a virtual adjusting button is one of the GUIs. The virtual adjusting button is used for simulating real knob-operated control. However, since the exterior appearances of the electronic devices become slimmer and more compact, performing control on the electronic devices with the virtual adjusting button becomes troublesome. That is to say, due to the downsizing of the electronic devices, screens provided with the electronic devices are also scaled down. Therefore, the virtual adjusting button displayed on the screens also decreases. Accordingly, when a user intends to control the virtual adjusting button on a downsized screen to perform adjustment of a setting value such as the volume, a certain problems are bound to occur. For example, difficulty in identifying the scale count of the virtual adjusting button (such as a knob), and also difficulty in controlling a rotating degree of the knob with precision.

Even if under certain circumstances, a developer designs scale graduations for the knob so that simply clicking directly on a scale graduation with a mouse cursor adjusts the setting value represented by the scale graduation; however, such a practice still fails to solve the problem of difficulty in identifying the scale count, and adjustment cannot be performed with precision, which misses on the point of having the knob. In addition, under other circumstances, the developer arranges a slider for the virtual adjusting button, and the user controls the rotating degree of the knob by dragging the slider. Nonetheless, such a solution is still not intuitive during operation, and the precision also awaits improvement.

SUMMARY

A method for operating a virtual adjusting button is provided, which are able to solve the problem that the virtual adjusting button is too small to control.

The method for operating the virtual adjusting button is suitable for an electronic device having a display unit and an operating unit for adjusting a setting value of the electronic device, the method including: displaying a virtual adjusting button on the display unit, wherein the virtual adjusting button is operated by an operating point of the operating unit for adjusting the setting value correspondingly; determining whether the operating point is located on the virtual adjusting button and the virtual adjusting button is selected; detecting a movement of the operating point when the operating point is located on the virtual adjusting button and the virtual adjusting button is selected; displaying a dynamic virtual adjusting button corresponding to the virtual adjusting button with the movement of the operating point when detecting that the operating point moves toward a direction away from or close to a reference point of the virtual adjusting button, and changing a displaying size of the dynamic virtual adjusting button in a corresponding relationship corresponding to the virtual adjusting button with a change of a distance between the operating point and the reference point, thereby operating the dynamic virtual adjusting button that has changed the displaying size via the operating point so as to change a precision of the setting value for adjusting.

According to an embodiment of the invention, when detecting that the operating point moves toward the direction away from the reference point, the displaying size of the dynamic virtual adjusting button is scaled up corresponding to the virtual adjusting button with the increase in the distance between the operating point and the reference point.

According to an embodiment of the invention, when detecting that the operating point moves toward the direction close to the reference point, the displaying size of the dynamic virtual adjusting button is scaled down correspondingly with the decrease in the distance between the operating point and the reference point.

According to an embodiment of the invention, when the displaying size of the dynamic virtual adjusting button is scaled down, the displaying size thereof is not smaller than an original displaying size of the virtual adjusting button.

According to an embodiment of the invention, the dynamic virtual adjusting button correspondingly changes the displaying size thereof proportionately with the change of the distance between the operating point and the reference point.

According to an embodiment of the invention, the dynamic virtual adjusting button correspondingly changes the displaying size thereof hierarchically with the change of the distance between the operating point and the reference point.

According to an embodiment of the invention, the method further includes: removing the dynamic virtual adjusting button without displaying the same on the display unit when detecting that the operating point releases the dynamic virtual adjusting button.

According to an embodiment of the invention, the method further includes: hiding the virtual adjusting button when displaying the dynamic virtual adjusting button. In addition, display of the virtual adjusting button is resumed when detecting that the operating point releases selection of the dynamic virtual adjusting button.

According to an embodiment of the invention, the method further includes: displaying simultaneously the virtual adjusting button and the dynamic virtual adjusting button on the display unit when displaying the dynamic virtual adjusting button. In addition, when the virtual adjusting button and the dynamic virtual adjusting button are displayed simultaneously, the dynamic virtual adjusting button is displayed in a translucent state.

According to an embodiment of the invention, the virtual adjusting button is annular, and the reference point is a center point thereof; the dynamic virtual adjusting button adjusts a radius thereof with change of the distance between the operating point and the center point in a corresponding relationship of a concentric manner having the same center point with the virtual adjusting button, so that the displaying size thereof is scaled up or down with respect to the virtual adjusting button.

According to an embodiment of the invention, the virtual adjusting button and the dynamic virtual adjusting button both include respectively: an operating range, accepting operation of the operating point to move along a predetermined adjustment direction, thereby adjusting the setting value; and a scale indicator, located on or adjacent to the operating range and capable of moving corresponding to the movement of the operating point in the operating range.

According to an embodiment of the invention, the virtual adjusting button and the dynamic virtual adjusting button both further include respectively a scale gauge having multiple scale graduations, wherein the scale gauge is adjacent to the operating range, so that the scale indicator corresponds to one of the scale graduation in the operating range when the scale indicator moves; and wherein the number of scale graduations displayed on the scale gauge of the dynamic virtual adjusting button increases or decreases with the size change of the dynamic virtual adjusting button, thereby changing the precision of the setting value for adjusting.

According to an embodiment of the invention, the operating unit may be a touch panel, and the operating point may be a touch point generated when the touch panel is touched.

According to an embodiment of the invention, the operating unit may be one of a touch pad, a mouse, a trackball and a trackpoint, and the operating point may be a cursor generated by operating one of the touch pad, the mouse, the trackball and the trackpoint.

Based on the above, when a user employs an operating unit to operate the original virtual adjusting button for making an operating point of the operating unit move toward a direction away from a reference point of the virtual adjusting button, the dynamic virtual adjusting button is scaled up, so as to select a desired scale graduation in the dynamic virtual adjusting button to further adjust the scale graduation of the virtual adjusting button according to the adjusted scale graduation of the dynamic virtual adjusting button. Thereby, the problem that the virtual adjusting button is too small to control is solved.

To make the above features and advantages of the invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Under the circumstance that the size of a display screen is too small, the appearance of the virtual adjusting button is also scaled down relatively, causing considerable inconveniences to a user during operation. Accordingly, a method for operating a virtual adjusting button is provided for solving the problem that the virtual adjusting button is too small to control, so as to be more convenient in use.

Figure 1:
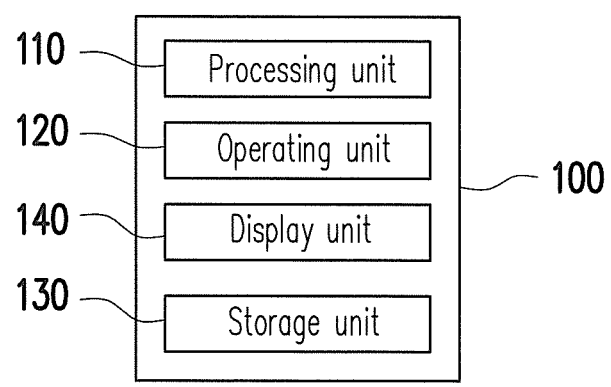
FIG. 1 is a block diagram illustrating an electronic device according to an embodiment of the invention.

FIG. 1 is a block diagram illustrating an electronic device according to an embodiment of the invention. Referring to FIG. 1, an electronic device 100 is, for example, a cellular phone, a smart phone, a tablet computer, a navigation device or a multimedia player, including at least a processing unit 110, a display unit 140, an operating unit 120 and a storage unit 130. The processing unit 110 is coupled to the operating unit 120 and the storage unit 130. The processing unit 110 is, for example, a central processing unit (CPU) or other programmable microprocessors. The display unit 140 may be any of various display devices capable of displaying a GUI, such as a liquid crystal display, an organic light-emitting display, a plasma display and an electronic paper.

The operating unit 120 may be any input device capable of operating a GUI displayed by the display unit 140, such as a touch panel, a touch pad, a mouse, a trackball and a trackpoint. Therein, the touch panel may be implemented with various kinds of touch sensing technology, such as resistive, capacitive, optical, acoustic wave or electromagnetic, and the kind of the touch panel is not limited herein. The operating unit 120 is used for sensing the touching of the touch panel or the touch pad by the user's finger or a touch pen, or for sensing the cursor generated by operating the mouse, the trackball or the trackpoint, thereby reporting information relevant to positions and actions to the processing unit 110 so as to generate a corresponding operating point on the display unit 140, wherein the operating point is a touch point for the touch panel and the touch pad, and a cursor for operating the mouse, the trackball and the trackpoint.

The storage unit 130 is, for example, a random access memory (RAM), a read-only memory (ROM), a flash memory or a magnetic disk storage device. A plurality of program code segments are stored in the storage unit 130. The program code segments are executed by the processing unit 110 after installation. The program code segments include a plurality of commands, and the processing unit 110 executes a plurality of steps in the operating method through the commands. In the embodiment, the electronic device 100 merely includes a processing unit 110, but in other embodiments, the electronic device 100 may also include a plurality of processing units 110, and the installed program code segments are executed by the processing units.

Figure 2:
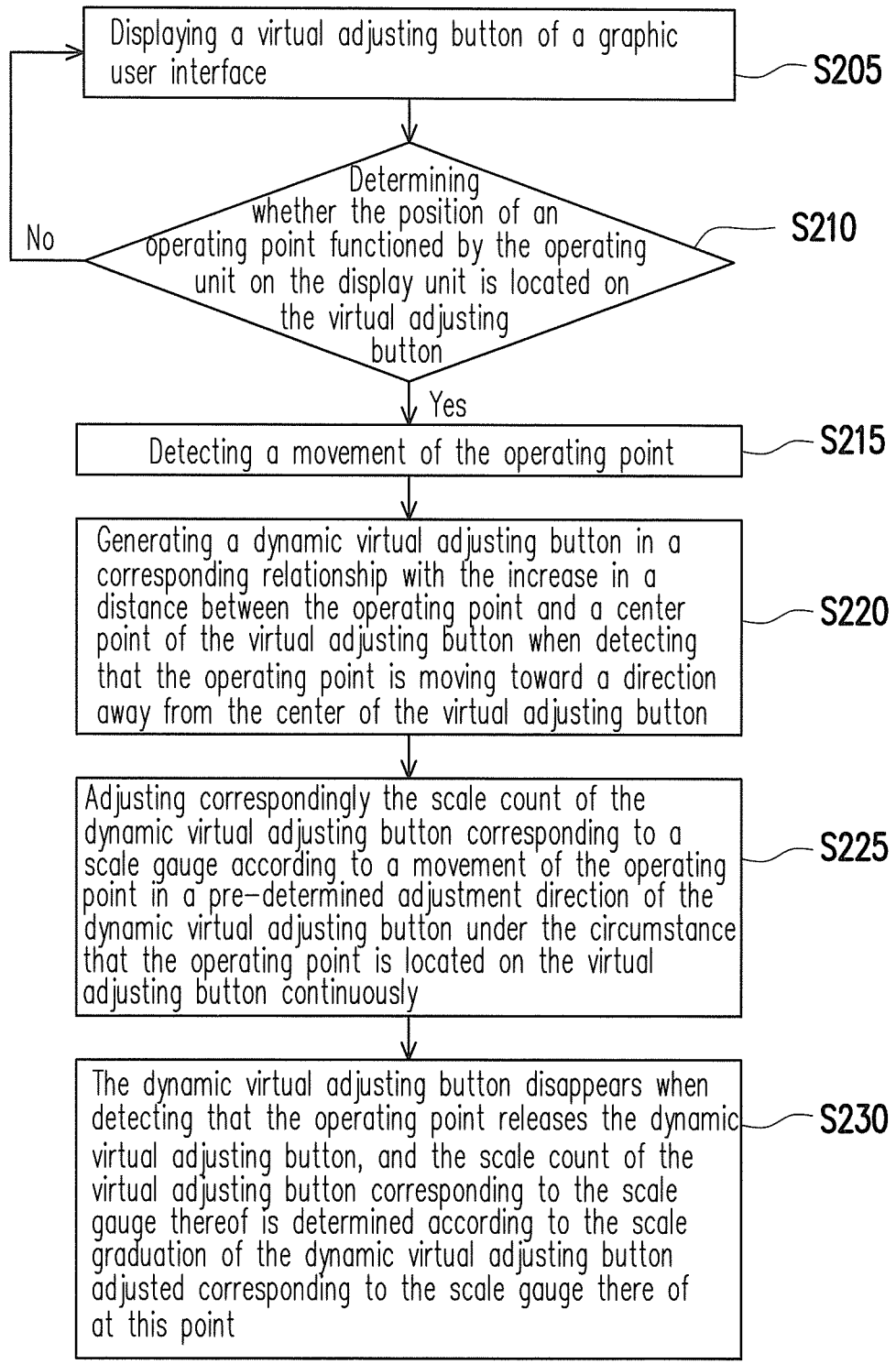
FIG. 2 is a flowchart of a method for operating a virtual adjusting button according to an embodiment of the invention.

An embodiment is further provided below to illustrate the method of operating the virtual adjusting button with reference to the aforementioned electronic device 100. FIG. 2 is a flowchart of a method for operating a virtual adjusting button according to an embodiment of the invention. The operating method of the embodiment is used in the electronic device 100, and the operating unit 120 may be a touch panel, and may also be a touch pad, a mouse, a trackball and a trackpoint. No limitation on the scope of application is provided herein. Descriptions are provided below with reference to FIGS. 1 and 2.

In step S205, the processing unit 110 displays a virtual adjusting button of the GUI on the display unit 140. Herein, the virtual adjusting button is annular, such as a ring-shaped adjusting button. In addition, in other embodiments, the virtual adjusting button may also be fan-shaped, disc-like, linear-shaped or any regular geometric shape. The virtual adjusting button is able to adjust a setting value correspondingly controlled by a software or a hardware, such as volume, brightness value, color contrast, temperature and multiple-speed fast forwarding according to the operation that the user performs with the operating unit 120 in a pre-determined direction (for example, when the virtual adjusting button is circular, rotation may be made in a clockwise or counter-clockwise direction). Therefore, a scale gauge corresponding to the range of the setting value may be displayed on or around the virtual adjusting button for the user to identify an adjustment direction for increment or decrement.

Next, in step S210, the processing unit 110 determines whether the position of an operating point that the operating unit 120 functions on the display unit 140 is located on the virtual adjusting button. That is, determining whether the coordinate position of the operating point is located in the area where the virtual adjusting button is situated. Herein, the virtual adjusting button has, for example, an operating range for modifying and controlling of the setting value corresponding to the virtual adjusting button. If the virtual adjusting button is a circular knob, the operating range is a whole circular area that rotation may be performed; if the virtual adjusting button is a ring-shaped knob, the operating range is a peripheral ring-shaped area located in the periphery that rotation may be performed. That is to say, the operating range may be a display area of the whole virtual adjusting button, and may also be a peripheral area surrounding the virtual adjusting button.

When the operating point is not located on the virtual adjusting button, the processing unit 110 does not trigger the following steps in the embodiment, but rather stays still in step S205, wherein the virtual adjusting button is displayed in the display unit 140.

When the operating point is located on the virtual adjusting button and the virtual adjusting button is selected, the processing unit 110 detects a movement of the operating point in step S215. Herein, it is further explained that if the operating unit 120 is, for example, the touch panel, the virtual adjusting button is selected when the touch point representing the operating point is located on the virtual adjusting button and touch of the virtual adjusting button by the touch point persists. If the operating unit 120 is, for example, the touch pad, the mouse, the trackball or the trackpoint, the virtual adjusting button is selected when the position of the cursor representing the operating point is located on the virtual adjusting button and clicking (such as pressing the left button of the mouse without release) is performed. After that, the processing unit 110 detects a moving direction of the operating point in the virtual adjusting button. For example, when the operating point selects the virtual adjusting button, is located within the range of the virtual adjusting button continuously and moves, the processing unit 110 determines whether the operating point is departing from or moving close to the center point of the virtual adjusting button (the center point may be a geometric center of the virtual adjusting button) or a pre-determined reference point according to the information about the position that the operating unit 120 reports.

In addition, when the operating point is located on the virtual adjusting button, if the processing unit 110 detects that the operating point is not continuously located on and neither selects the virtual adjusting point, such as detecting that the operating point has been disengaged (the finger leaving the touch panel when the operating point is the touch point, and releasing the left button of the mouse when the operating point is the mouse cursor), the process is not carried on to other steps, but still merely the virtual adjusting button is displayed in the display unit 140.

Next, in step S220, when the processing unit 110 detects that the operating point is moving away from the center point of the virtual adjusting button, a dynamic virtual adjusting button is generated proportionately, exponential proportionally, logarithm proportionally, hierarchically or in any adequate corresponding relationship with the increase in the distance between the operating point and the center point of the virtual adjusting button. That is, the processing unit 110 displays the dynamic virtual adjusting button in the display unit 140, and afterwards, the displaying size of the dynamic adjusting button is correspondingly scaled up or down according to whether the operating point moves continuously away from or close to the center point of the virtual adjusting button. That is, when the operating point moves away from the center point of the virtual adjusting button, the processing unit 110 has the displaying size of the dynamic virtual adjusting button scaled up proportionately; when the operating point moves close to the center point of the virtual adjusting button, the processing unit 110 has the displaying size of the dynamic virtual adjusting button scaled down proportionately. The dynamic virtual adjusting button differs from the original virtual adjusting button. For example, the dynamic virtual adjusting button may be a concentric virtual adjusting button having a different size that is scaled up or down proportionately from the original virtual adjusting button. The original virtual adjusting button and the dynamic virtual adjusting button have a plurality of scale graduations. A scale gauge including most scale graduations of the setting values is displayed respectively along the direction of setting value adjustment surrounding or inside both the virtual adjusting button and the dynamic virtual adjusting button, and the scale gauge of the dynamic virtual adjusting button corresponds to the scale gauge of the original virtual adjusting button.

More specifically, the processing unit 110 displays the dynamic virtual adjusting button corresponding to the virtual adjusting button on the display unit 140 when detecting that the operating point is located on the virtual adjusting button and the virtual adjusting button is selected. At this point, the displaying size of the dynamic virtual adjusting button and that of the virtual adjusting button are the same. Therefore, when the user retains the operating point (such as the finger used in touch operation) on the virtual adjusting point (the operating point is not yet moved), the visual perception will merely be a virtual adjusting button in the display unit 140. When the user moves the operating point, the processing unit 110 displays and adjusts the dynamic virtual adjusting button corresponding to the virtual adjusting button proportionately or in a pre-determined ratio according to the distance between the operating point and the center point of the virtual adjusting button.

In other embodiments, the processing unit 110 may not display the dynamic virtual adjusting button corresponding to the virtual adjusting button on the display unit 140 when detecting that the operating point is located on the virtual adjusting button and the virtual adjusting button is selected, but rather display the the dynamic virtual adjusting button corresponding to the virtual adjusting button on the display unit 140 when detecting that the operating point moves in a direction away from the center point of the virtual adjusting button.

In addition, in other embodiments, under the circumstance that the smallest displaying size of the dynamic virtual adjusting button is set as the original size of the virtual adjusting button, when the operating point is located on the virtual adjusting button and moves close to the center point of the virtual adjusting button, the dynamic virtual adjusting button is not further scaled down, or even is not displayed at all.

After the dynamic virtual adjusting button is generated, in step S225, under the circumstance that the operating point is continuously located on the virtual adjusting button, the processing unit 110 correspondingly adjusts the scale count of the dynamic virtual adjusting button corresponding to the scale gauge according to the movement of the operating point on the dynamic virtual adjusting button in a pre-determined adjustment direction. For example, the virtual adjusting button has the operating range for controlling the corresponding scale gauge of the virtual adjusting button, and the dynamic virtual adjusting button is the virtual adjusting button scaled up and down proportionately. Therefore, the dynamic virtual adjusting button also has a corresponding dynamic operating range. Thereby, after the user moves the operating point away from the center point of the virtual adjusting button and enlarges the dynamic virtual adjusting button, the user is able to make movements in the scaled-up dynamic operating range with respect to the scale gauge to adjust to a corresponding desired scale graduation. The processing unit 110 adjusts the setting value represented by the dynamic virtual adjusting button according to the sliding of the operating point in the dynamic operating range of the dynamic virtual adjusting button with respect to the scale gauge.

In step S230, when the processing unit 110 detects that the operating point releases the dynamic virtual adjusting button, the dynamic virtual adjusting button disappears, and the processing unit 110 determines the scale count of the virtual adjusting button corresponding to the scale gauge according to the scale graduation that the dynamic virtual adjusting button adjusts corresponding to the scale gauge thereof at this point. For example, when the processing unit 110 adjusts the corresponding scale count of the dynamic virtual adjusting button according to the sliding of the operating point in the dynamic operating range of the dynamic virtual adjusting button, the corresponding scale count of the virtual adjusting button is adjusted simultaneously. Therefore, when the operating point is released, the virtual adjusting button stays at the adjusted corresponding scale count.

Thereby, when the operating point touches the original virtual adjusting button and slides outwards at a first timing, the dynamic virtual adjusting button is displayed, and the dynamic virtual adjusting button is continuously scaled up proportionately according to the distance away from the center point of the virtual adjusting button. In addition, when a desired corresponding scale count is selected and the operating point releases the dynamic virtual adjusting button, the display screen resumes from the scaled-up dynamic virtual adjusting button to the original virtual adjusting button.

For the convenience of description, a schematic diagram of specific operation having the operating unit 120 as a touch panel is further provided below for description. FIGS. 3A-3D are schematic diagrams of operating a virtual adjusting button according to an embodiment of the invention. The embodiment is merely one of the applications, and the invention is not limited thereto. The descriptions below are provided with reference to all of FIGS. 1 and 3A-3D.

Figure 3A:
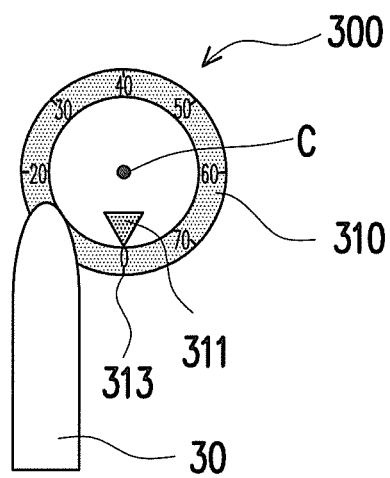
FIGS. 3A-3D are schematic diagrams of operating the virtual adjusting button according to an embodiment of the invention.
Figure 3B:
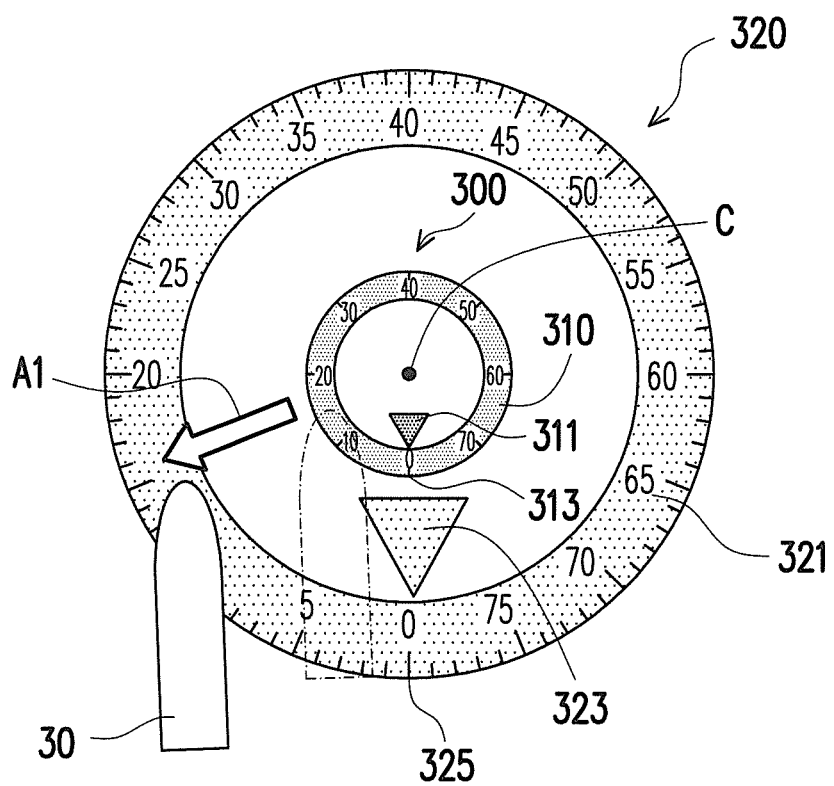

FIGS. 3A-3D show a screen of the display unit 140 (herein a touch screen, for example). In FIG. 3A, a virtual adjusting button 300 has an operating range 310, a scale indicator 311 and a scale gauge 313. The user may use a touch object 30 (for example, a finger) to touch the virtual adjusting button 300 (to generating a touch point) for a while to select the virtual adjusting button 300, and further slide along a pre-determined adjustment direction within the operating range 310 to adjust the scale graduation of the scale indicator 311 of the virtual adjusting button 300 corresponding to the scale gauge 313. In the present embodiment, the virtual adjusting button 300 is a ring-shaped knob. The assumption herein is that the touch object 300 is located within the operating range 310 and slides away from a center point C of the virtual adjusting button 300, as shown in FIG. 3B.

In FIG. 3B, when the touch object 30 slides away from the center point C of the virtual adjusting button 300 (i.e. sliding toward an arrow A1), with the sliding of the touch object 30 toward the arrow A1, the display unit 140 displays a dynamic virtual adjusting button 320 at the periphery of the original virtual adjusting button 300, and the displaying size of the dynamic virtual adjusting button 320 is relatively scaled up. Therein, the virtual adjusting button 320 also correspondingly has a dynamic operating range 321, a dynamic scale indicator 323 and a dynamic scale gauge 325. In simpler terms, when the processing unit 110 detects that the touch object 30 moves away from the center point C of the virtual adjusting button 300, the dynamic virtual adjusting button 320 corresponding to the virtual adjusting button 300 is displayed in the display unit 140, and the displaying size of the dynamic virtual adjusting button 320 is relatively scaled up (i.e. having an increased radius) with the increase in the distance between the touch object 30 and the center point C of the virtual adjusting button 300.

In the present embodiment, the processing unit 110 displays the virtual adjusting button 300 and the dynamic virtual adjusting button 320 in the display unit 140 simultaneously. In addition, when the virtual adjusting button 300 and the dynamic virtual adjusting button 320 are displayed simultaneously, the dynamic virtual adjusting button 320 is displayed in a translucent state. Besides, the dynamic virtual adjusting button 320 and the virtual adjusting button 300 appear to be concentric and are scaled up and down toward an outer side of the virtual adjusting button 300. Moreover, the dynamic virtual adjusting button 320 is scaled up or down proportionately with respect to the virtual adjusting button 300. The above realizations may be modified according to different user needs.

In other embodiments, the processing unit 110 hides the original virtual adjusting button 300 without displaying the original virtual adjusting button 300 in the display unit 140 when displaying the dynamic virtual adjusting button 320 corresponding to the virtual adjusting button 300. That is to say, the user merely sees the dynamic virtual adjusting button 320 in the display screen without seeing the virtual adjusting button 300. For example, the processing unit 110 may use another layer as the dynamic virtual adjusting button 320 to directly cover the virtual adjusting button 300, thereby realizing hiding of the virtual adjusting button 300. Such is merely an example, and the invention is not limited thereto. In addition, when detecting that the touch object 30 releases the dynamic virtual adjusting button 320, i.e. when the touch object 30 leaves the operating unit 120, the processing unit 110 resumes display of the virtual adjusting button 300.

Figure 3C:
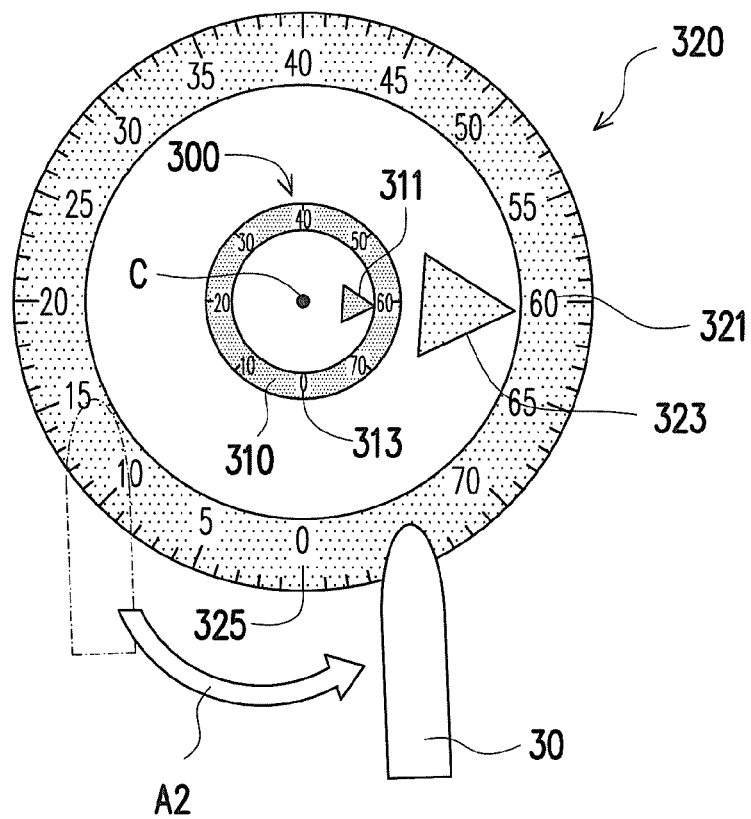

Back to the present embodiment, in FIG. 3C, under the circumstance that the touch object 30 touches the dynamic virtual adjusting button 320 continuously, when the processing unit 110 detects that the touch object 30 slides on the dynamic virtual adjusting button 320 in a pre-determined direction, the dynamic scale indicator 323 of the dynamic adjusting button 320 is adjusted with respect to the scale count of the scale gauge 313. For example, when the user moves the touch object 30 in the counter-clockwise direction, as shown by an array A2, the dynamic virtual adjusting button 320 and the dynamic scale indicator 323 rotates in the counter-clockwise direction with the movement of the touch object 30. In the present embodiment, since the dynamic virtual adjusting button 320 and the virtual adjusting button 300 are displayed simultaneously, when adjusting the scale count of the dynamic virtual adjusting button 320 with respect to the dynamic scale gauge 325 thereof, the processing unit 110 thereby adjusts the scale count of the virtual adjusting button 300 with respect to the scale gauge 313 thereof synchronically.

Figure 3D:
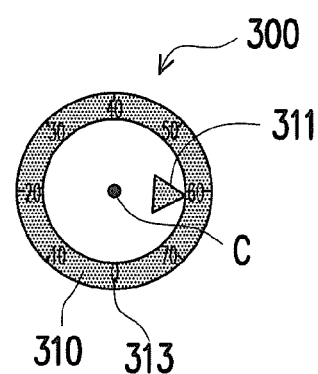

When detecting that the touch object 30 releases the dynamic virtual adjusting button 320, as shown in FIG. 3D, the processing unit 110 removes the dynamic virtual adjusting button 320 from the display unit 140 and merely displays the virtual adjusting button 300 that has adjusted the scale count.

Regarding scaling of the displaying size of the dynamic virtual adjusting button according to the distance between the touch object and the center point of the virtual adjusting button, an example is provided below for further description, taking identical elements with the embodiment of FIGS. 3A-3D as an example.

Figure 4A:
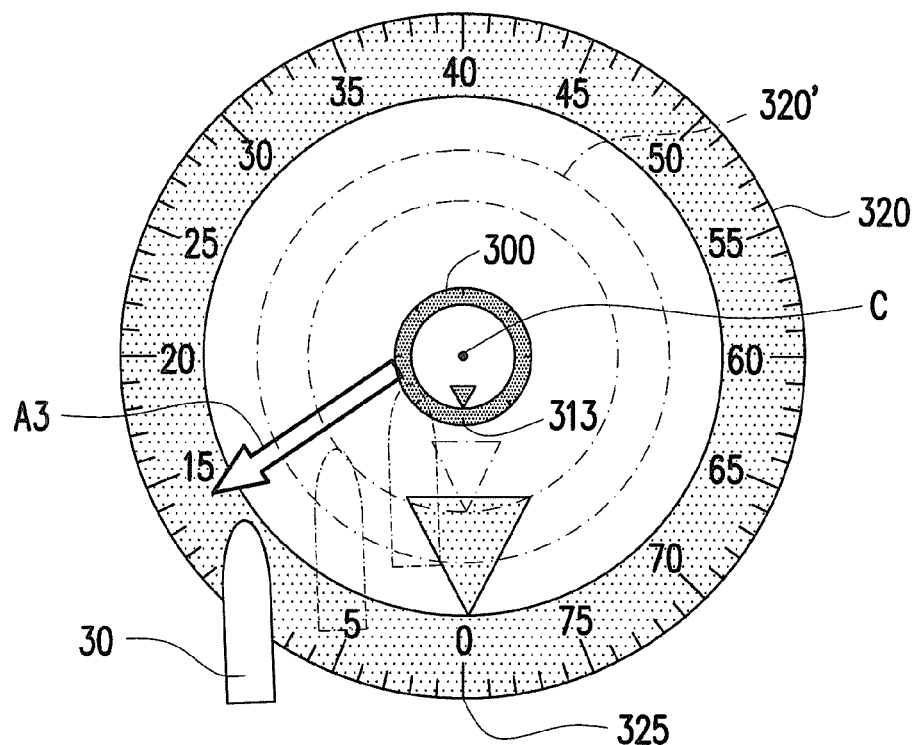
FIGS. 4A and 4B are schematic diagrams of operating the scaling of a dynamic virtual adjusting button hierarchically according to another embodiment of the invention.
Figure 4B:
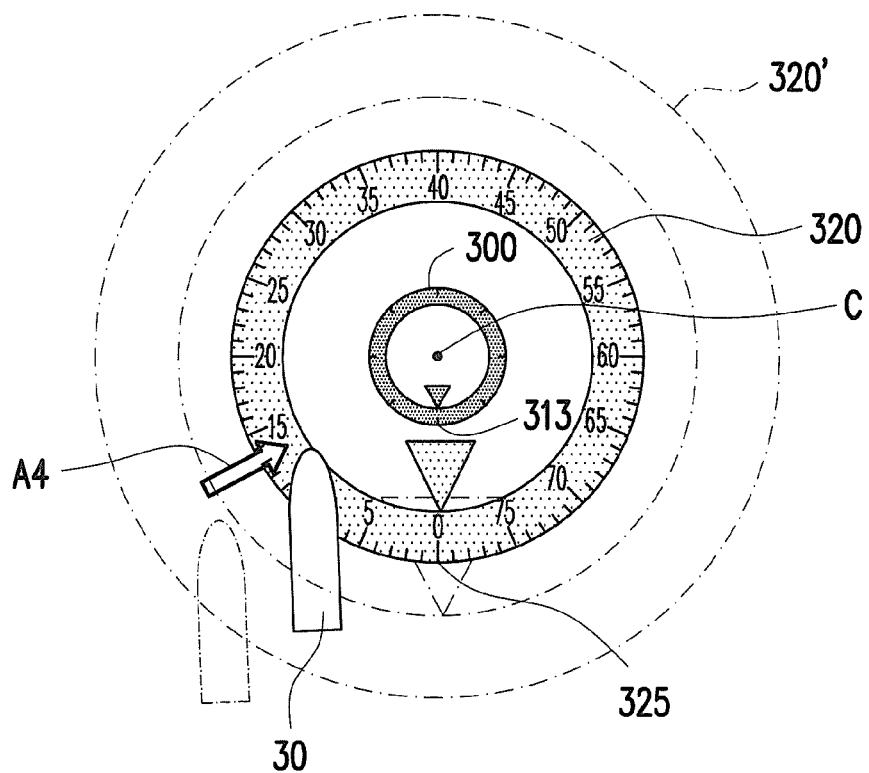

FIGS. 4A and 4B are schematic diagrams of operating the scaling of a dynamic virtual adjusting button hierarchically according to another embodiment of the invention. The embodiment is merely one of the applications, and the invention is not limited thereto. Referring to all of FIGS. 1, 4A and 4B for the descriptions below, FIGS. 4A and 4B show a screen of a display unit 140 (herein a touch screen, for example). Herein, elements having identical functions as those in FIGS. 3A-3D are assigned identical numerals, and descriptions thereabout are omitted.

In FIG. 4A, with the touch object 30 moves farther away from the virtual adjusting button 300, i.e. when the distance between the touch object 30 and the center point C of the virtual adjusting button 300 increases, the displaying size of the dynamic virtual adjusting button 320 enlarges therewith hierarchically. That is to say, when the touch object 30 slides toward an array A3, the displaying size of the dynamic virtual adjusting button 320 enlarges toward an outer side of the virtual adjusting button 300 phase by phase, rather than the proportionately linear enlargement in the previous embodiment. In terms of the present embodiment, when the touch object 30 has slided to a pre-determined outermost position and displays the dynamic virtual adjusting button 320 of the maximum size, a chain line 320' on the inner side shows an area possibly displayed during the scaling of the dynamic virtual adjusting button 320. That means, in terms of the present embodiment, the size of the dynamic virtual adjusting button 320 may appear in a total of 3 hierarchical variations with the departure from the center point C from within to without, such as the dynamic virtual adjusting button 320 at the outermost third phase in FIG. 4A.

In FIG. 4B, when the touch object 30 moves close to the virtual adjusting button 300 in reverse from FIG. 4A (the touch object 30 slides toward an array A4), i.e. when the distance between the touch object 30 and the center point C of the virtual adjusting button 300 decreases, the displaying size of the dynamic virtual adjusting button 320 is scaled down therewith hierarchically. In terms of FIG. 4B, the dynamic virtual adjusting button 320 returns from the third phase having the largest radius to the second phase having a smaller radius.

It is noteworthy that with the increase in the distance between the touch object 30 and the center point C of the virtual adjusting button 300, in addition to having the displaying size of the dynamic virtual adjusting button 320 scaled up, the processing unit 110 thus also has the dynamic scale gauge 325 scaled up synchronically, thereby increasing the precision of the corresponding setting value for adjusting of the dynamic virtual adjusting button 320. In addition, with the decrease in the distance between the touch object 30 and the center point C of the virtual adjusting button 300, the displaying size of the dynamic virtual adjusting button 320 is scaled down, and the dynamic scale gauge 325 is scaled down synchronically, thereby reducing the precision of the corresponding setting value for adjusting of the dynamic virtual adjusting button 320.

Figure 5A:
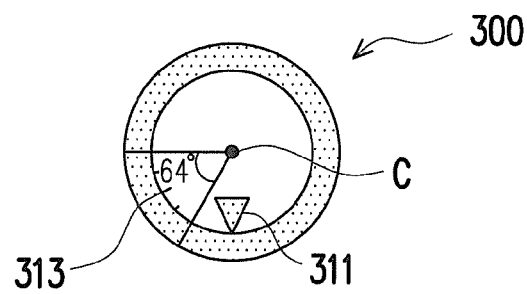
FIGS. 5A-5C are schematic diagrams of the precision of a corresponding setting value for adjusting by scaling a dynamic virtual adjusting button up or down according to the invention.
Figure 5B:
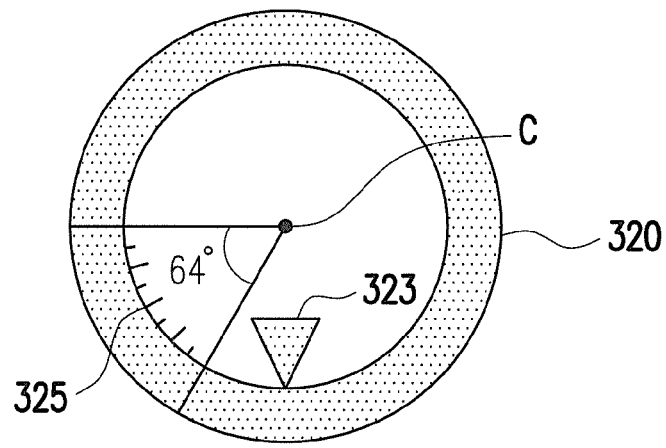
Figure 5C:
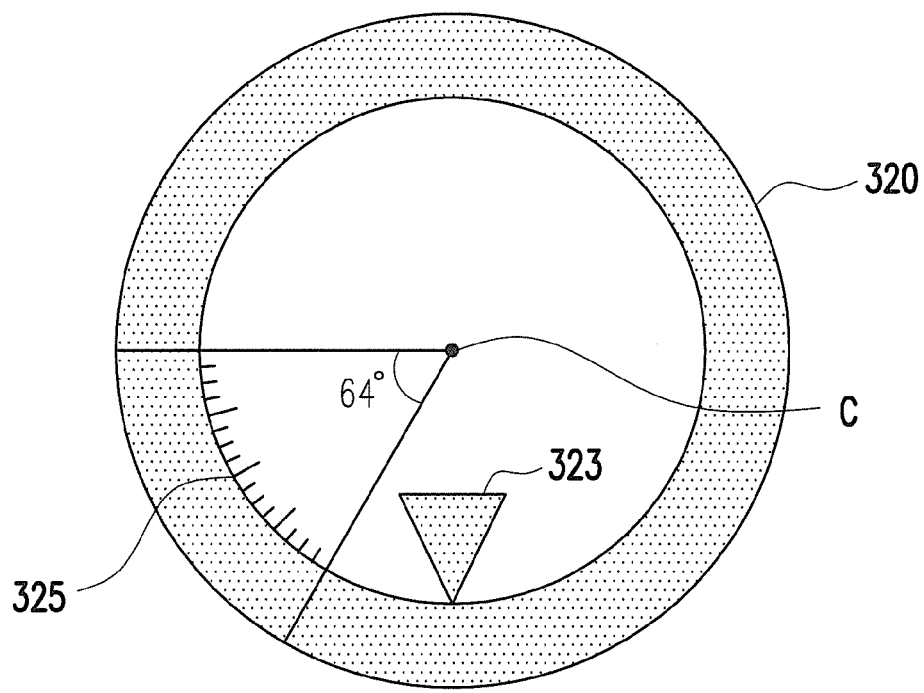

For example, FIGS. 5A-5C are schematic diagrams of the precision of a corresponding setting value for adjusting by scaling a dynamic virtual adjusting button up or down according to the invention. The scaling of the dynamic virtual adjusting button 320 of the embodiment may be referred to in the descriptions for FIGS. 3A-3D and 4A-4B and is not described in detail herein. FIG. 5A shows the original size of the virtual adjusting button 300. FIGS. 5B and 5C show the scaled-up dynamic virtual adjusting button 320, wherein the displaying size in FIG. 5B is smaller than the displaying size in FIG. 5C.

As shown in FIG. 5A, the assumption is that the range of the scale graduation of the setting value displayed by the virtual adjusting button 300 correspondingly within, for example, a range of 64 degrees is 4 scale graduations (i.e. the interval between each scale graduation is 16 degrees). When the dynamic virtual adjusting button 320 is scaled up to that as shown in FIG. 5B, the scale range displayed by the dynamic virtual adjusting button 320 increases to 8 scale graduations (i.e. the interval between each scale graduation reduces to 8 degrees). When the dynamic virtual adjusting button 320 is scaled up to that as shown in FIG. 5C, the scale range displayed by the dynamic virtual adjusting button 320 further increases to 16 scale graduations (i.e. the interval between each scale graduation further reduces to 4 degrees). Accordingly, when the dynamic virtual adjusting button 320 is enlarged from FIG. 5A to 5C, in the same range of 64 degrees, the amount of scale graduations of the dynamic scale gauge 325 increases therewith, which means that the precision of the corresponding selectable setting value thereof also increases therewith. Therefore, when the user rotates the dynamic virtual adjusting button 320 in the clockwise or counter-clockwise direction, the scale indicator 323 thereof is adjusted to align with a finer scale count, which means that the user is thereby able to adjust to a more precise setting value. Simply put, the user is able to obtain a corresponding higher or lower scale precision by sliding away from or close to the center point C of the virtual adjusting button 300.

The above description utilizes the characteristic that concentric circles have a longer circumference when the radius is larger. After touching and selecting the virtual adjusting button 300 with the touch object (for example, the finger) or the cursor, when performing the action of moving the touch object or the cursor away from the center point (the circle center in the embodiment) of the virtual adjusting button 300, another enlarged virtual adjusting button (i.e. the dynamic virtual adjusting button 320) appears around the original virtual adjusting button 300. Since the circumference of the dynamic virtual adjusting button 320 is longer now, the number of scale graduations displayed corresponding to the dynamic scale gauge 325 within the same degree range is more than that of the dynamic scale gauge 313 of the original virtual adjusting button 300. When more scale graduations appear, it is easier to adjust accurately to a desired more precise setting value represented by a more precise scale graduation.

In the embodiment, the scale gauge 313 is displayed on the inner side of the virtual adjusting button 300 and the dynamic virtual adjusting button 320. However, the same may also be displayed on the outer side or in the interior of the virtual adjusting button 300 and the dynamic virtual adjusting button 320, or even displayed in other areas (that are a non-virtual adjusting button 300 and a non-dynamic virtual adjusting button 320) of the display unit 140. Alternatively, the scale gauge 313 may not be displayed, and merely the corresponding setting values indicated by the scale indicator 311 of the scale gauge 313 and by the dynamic scale indicator 323 of the dynamic scale gauge 325 are displayed in an adequate place (which means that the virtual adjusting button 300 and the dynamic virtual adjusting button 320 have an embedded virtual adjusting gauge 313 and an embedded dynamic scale gauge 325).

As described in the above, the virtual adjusting button of the invention is not limited to the ring shape as disclosed in the embodiment, but may also be disc-like, linear-shaped or other geometric shapes. For example, in another embodiment, the virtual adjusting button may be a linear-shaped scroll bar. As the method of the embodiment indicates, when the user operates and drags an operating point from the scroll bar to the side edge (away from the center point), another dynamic virtual adjusting button appears in the same shape of the scroll bar, and the size thereof is similarly scaled up or down corresponding to the change of the distance with the movement of the operating point. Since the principles are identical with those in each of the embodiments merely with a difference in the shape of the virtual adjusting button, descriptions are not repeated herein.

In light of the above, with the use of the dynamic virtual adjusting button corresponding to the virtual adjusting button, the adjustable area is scaled up, thereby solving the problem that the virtual adjusting button is too small to control. In addition, at the same time when the dynamic virtual adjusting button is scaled up, the scale gauge is scaled up and the amount of scale graduations is increased, so as to adjust to the desired setting value more precisely.

Although the invention has been described with reference to the above embodiments, it will be apparent to one of ordinary skill in the art that modifications to the described embodiments may be made without departing from the spirit and scope of the invention. Accordingly, the scope of the invention will be defined by the attached claims and not by the above detailed descriptions.

What is claimed is:

1. A method for operating a virtual adjusting button, suitable for an electronic device having a display unit and an operating unit for adjusting a setting value of the electronic device, the method comprising:

displaying a virtual adjusting button on the display unit, wherein the virtual adjusting button is operated by an operating point of the operating unit to adjust the setting value correspondingly;

determining whether the operating point is located on the virtual adjusting button and the virtual adjusting button is selected;

detecting a movement of the operating point when the operating point is located on the virtual adjusting button and the virtual adjusting button is selected;

displaying a dynamic virtual adjusting button corresponding to the virtual adjusting button with the movement of the operating point when detecting that the operating point moves toward a direction away from or close to a reference point of the virtual adjusting button, wherein a displaying size of the dynamic virtual adjusting button is changed in a corresponding relationship corresponding to the virtual adjusting button with a change of a distance between the operating point and the reference point, a precision of the setting value for adjusting is changed by operating the dynamic virtual adjusting button having a changed displaying size via the operating point, and wherein the dynamic virtual adjusting button displays a same range of the setting value as that of the virtual adjusting button in a scaled-up or scaled-down manner, and wherein the dynamic virtual adjusting button and the virtual adjusting button are displayed in a concentric manner with the reference point as a center point.

2. The method according to claim 1, wherein the displaying size of the dynamic virtual adjusting button is scaled up corresponding to the virtual adjusting button with the increase in the distance between the operating point and the reference point when detecting that the operating point moves toward the direction away from the reference point.

3. The method according to claim 1, wherein the displaying size of the dynamic virtual adjusting button is scaled down correspondingly with the decrease in the distance between the operating point and the reference point when detecting that the operating point moves toward the direction close to the reference point.

4. The method according to claim 3, wherein the displaying size of the dynamic virtual adjusting button is not smaller than an original displaying size of the virtual adjusting button when the displaying size of the dynamic virtual adjusting button is scaled down.

5. The method according to claim 1, wherein the dynamic virtual adjusting button correspondingly changes the displaying size thereof proportionately with the change of the distance between the operating point and the reference point.

6. The method according to claim 1, wherein the dynamic virtual adjusting button correspondingly changes the displaying size thereof hierarchically with the change of the distance between the operating point and the reference point.

7. The method according to claim 1, further comprising:
not displaying the dynamic virtual adjusting button on the display unit when detecting that the operating point releases the dynamic virtual adjusting button.

8. The method according to claim 1, further comprising:
hiding the virtual adjusting button when the dynamic virtual adjusting button is displayed.

9. The method according to claim 8, further comprising:
resuming display of the virtual adjusting button when detecting that the operating point releases selection of the dynamic virtual adjusting button.

10. The method according to claim 1, further comprising:
displaying simultaneously the virtual adjusting button and the dynamic virtual adjusting button on the display unit when the dynamic virtual adjusting button is displayed.

11. The method according to claim 10, further comprising:
displaying the dynamic virtual adjusting button in a translucent state when the virtual adjusting button and the dynamic virtual adjusting button are displayed simultaneously.

12. The method according to claim 1, wherein the virtual adjusting button is annular; the dynamic virtual adjusting button adjusts a radius thereof with the change of the distance between the operating point and the center point in a corresponding relationship of the concentric manner having the same center point with the virtual adjusting button, so that the displaying size thereof is scaled up or down with respect to the virtual adjusting button.

13. The method according to claim 1, wherein the virtual adjusting button and the dynamic virtual adjusting button both comprise respectively:
an operating range, accepting operation of the operating point to move along a pre-determined adjustment direction so as to adjust the setting value; and
a scale indicator, located on or adjacent to the operating range and moving correspondingly with the movement of the operating point in the operating range.

14. The method according to claim 13, wherein the virtual adjusting button and the dynamic virtual adjusting button both further comprise respectively a scale gauge having multiple scale graduations, wherein the scale gauge is adjacent to the operating range, so that the scale indicator corresponds to one of the scale graduations when the scale indicator moves;
and wherein the number of scale graduations displayed on the scale gauge of the dynamic virtual adjusting button increases or decreases with the size change of the dynamic virtual adjusting button, so as to change the precision of the setting value for adjusting.

15. The method according to claim 1, wherein the operating unit is a touch panel and the operating point is a touch point generated when the touch panel is touched.

16. The method according to claim 1, wherein the operating unit is one of a touch pad, a mouse, a trackball and a trackpoint, and the operating point is a cursor generated when operating one of the touch pad, the mouse, the trackball and the trackpoint.

* * * * *